May 7, 1929. P. H. BACHRACH 1,712,322
AUXILIARY OR EMERGENCY VEHICLE WHEEL
Filed Aug. 30, 1928   3 Sheets-Sheet 1
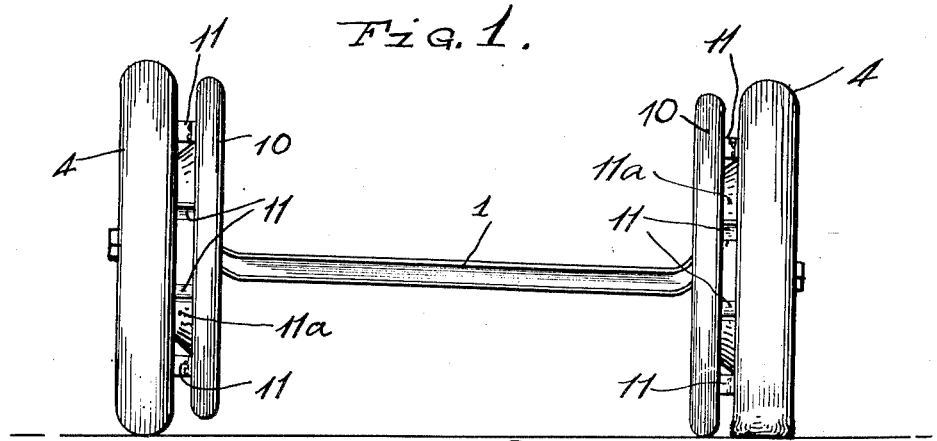
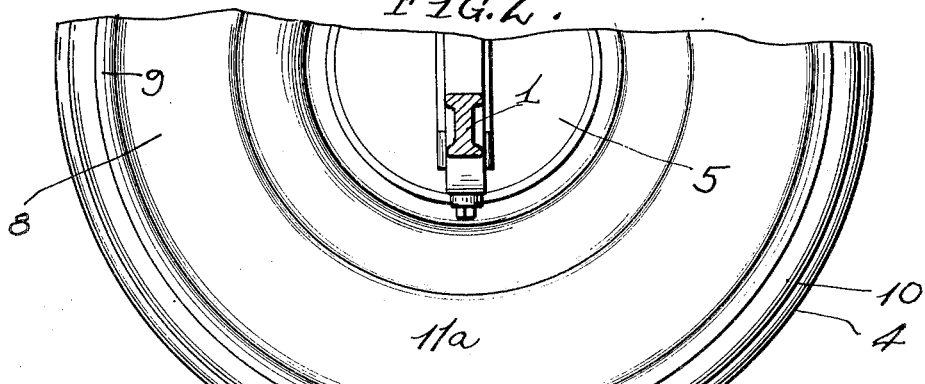
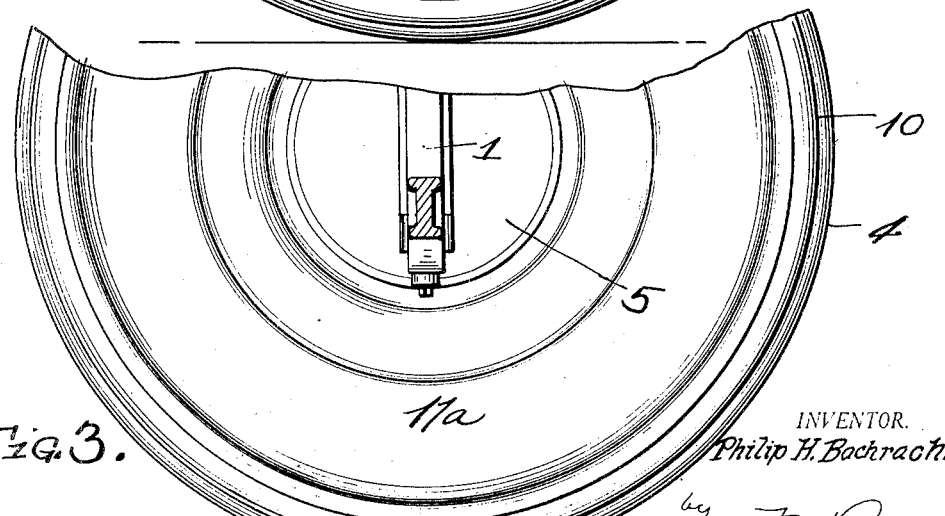
INVENTOR.
Philip H. Bachrach.
ATTORNEY.

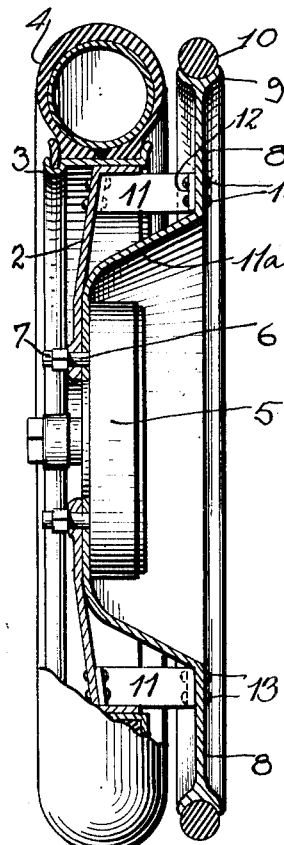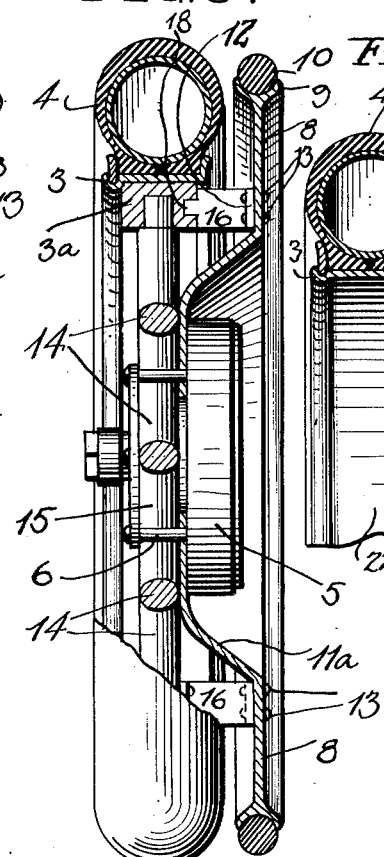

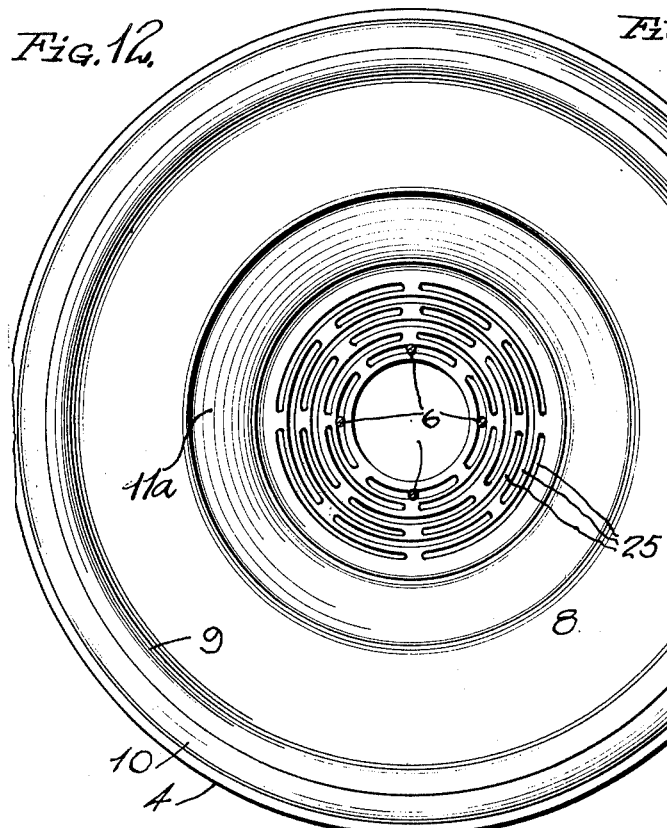
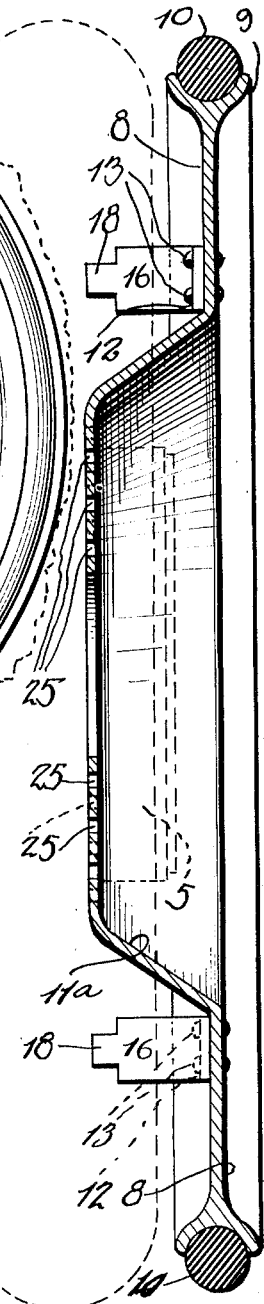
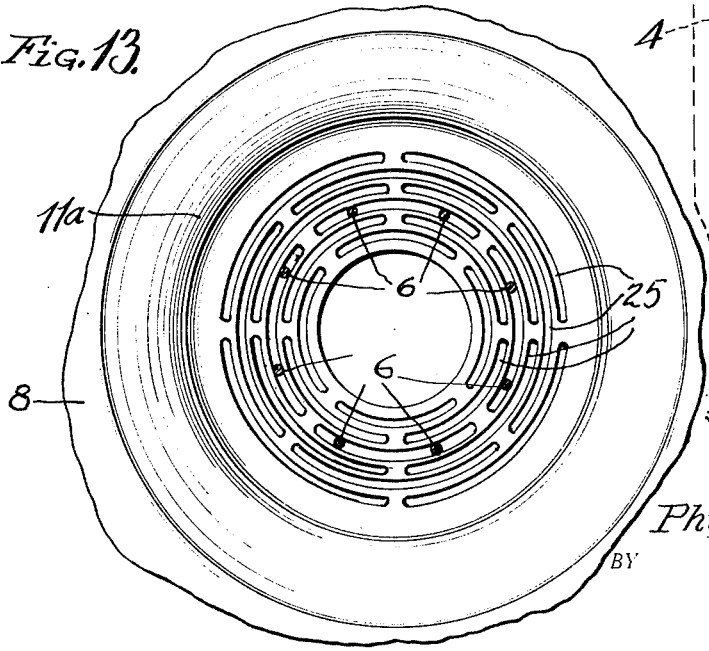

Patented May 7, 1929.

1,712,322

UNITED STATES PATENT OFFICE.

PHILIP H. BACHRACH, OF OCEANSIDE, CALIFORNIA.

AUXILIARY OR EMERGENCY VEHICLE WHEEL.

Application filed August 30, 1928. Serial No. 302,959.

This invention relates to certain new and useful improvements in auxiliary or emergency wheel structures for motor vehicles and has for its primary object the provision of a cushion tired emergency wheel, in its preferred form, designed for association with a motor vehicle wheel to be automatically brought into play or ground contact upon partial deflation of the regular motor vehicle tire and also upon complete collapse of the latter for the purpose of supporting the motor vehicle and permitting continued travel thereof with liability of injury to the deflated pneumatic tire structure eliminated.

A further object of the invention is to provide an auxiliary or emergency wheel for association with the usual traction wheel of a motor vehicle that is designed for association with automobile wheels of the disk, artillery or wire spoke type, the auxiliary wheel preferably being of the disk type and occupying the space at the inner side of the vehicle wheel and being adaptable for association with motor vehicle wheels and axles of standard construction without, in any way, altering the vehicle construction.

With the above and other objects in view that will become apparent as the nature of the invention is better understood, the same consists in the novel construction, combination and arrangement of parts to be hereinafter more fully described and then claimed.

In the accompanying drawings forming a part of this application and to which reference is had by like characters designating corresponding parts throughout the several views:

Fig. 1 is a diagrammatic front elevational view of a vehicle axle equipped with pneumatic tired wheels and auxiliary traction wheels associated with the aforesaid wheels, one of the auxiliary wheels being normally positioned above the ground line and the other one lowered into ground contact with the tire of the adjacent vehicle wheel illustrated as partially deflated.

Fig. 2 is a fragmentary side elevational view, with the axle bar shown in section, of the vehicle wheel and auxiliary wheel with the latter disposed above the ground line, Fig. 3 is a view, similar to Fig. 2 showing the vehicle wheel tire partly deflated and the auxiliary wheel lowered into ground contact, Fig. 4 is a vertical cross sectional view of an assembled vehicle wheel and an auxiliary wheel, the vehicle wheel being of a disk type with the auxiliary wheel anchored thereto adjacent the disk wheel hub and rim, Fig. 5 is a vertical cross sectional view showing an auxiliary wheel anchored to a vehicle wheel of the wooden spoke or artillery type, Fig. 6 is a vertical cross sectional view showing the auxiliary wheel anchored to a vehicle wheel of the wire spoke type, Fig. 7 is a fragmentary vertical sectional view showing a side flange extension on a demountable rim carrying an auxiliary solid tire, Fig. 8 is a fragmentary side elevational view of the assembled wheel structure shown in Fig. 4 viewed from the auxiliary wheel side thereof, Fig. 9 is a perspective view of the plate clip connecting the wheel structures of Fig. 4, Fig. 10 is a perspective view of the plate clip connecting the wheel structures of Fig. 5, Fig. 11 is a perspective view of the plate clip connecting the wheel structures of Fig. 6, Fig. 12 is a side elevational view of an assembled auxiliary wheel and a vehicle wheel showing a plurality of concentric slots in the disk portion of the auxiliary wheel with the attaching bolts extending through the inner slots, Fig. 13 is a fragmentary side elevational view, similar to Fig. 12 showing the attaching bolts passed through intermediate ones of the concentric slots, and Fig. 14 is a vertical cross sectional view of the auxiliary wheel shown in Figs. 12 and 13, the vehicle wheel with which the same is associated being fragmentarily illustrated by dotted lines.

Briefly described, the invention aims to provide an auxiliary wheel for attachment to the usual ground wheel of a motor vehicle and the auxiliary wheel is of a diameter less than the diameter of the inflated pneumatic tire of the vehicle wheel with the auxiliary wheel normally disposed above the ground line and lowered into contact with the ground upon partial or complete deflation of the pneumatic tire for supporting the vehicle and permitting continued running operation of the vehicle, thereby eliminating injury to the tire and tube of the ground wheel. It is also intended that the auxiliary or emergency wheel occupy a space in close proximity to the vehicle wheel without the necessity of altering the vehicle construction in any way and also without interfering with the brake mechanism. In addition to attaching means arranged adjacent the centers of the main and auxiliary wheels, plate clips connect the said wheels adjacent their peripheral edges and function as traction devices in extricating the vehicle from mud or sand.

Referring more in detail to the accompanying drawings, there is illustrated a vehicle axle 1 carrying wheel bearings upon which pneumatic tired wheels are mounted, one form of wheel as illustrated in Fig. 4 comprising a body disk 2 having a felly portion upon which the rim 3 is supported, the rim carrying a pneumatic tire 4. The brake drum 5 carries laterally projecting bolts 6 extending through the wheel disk 2 for anchoring the auxiliary wheel to the ground wheel, retaining nuts 7 being threaded on the ends of the bolts.

The auxiliary wheel in the form of the invention shown in Fig. 4 comprises a disk 8 with a relatively small peripheral rim 9 upon which a solid cushion tire 10 is mounted. The central portion of the disk 8 of the auxiliary wheel is dished at 11ª and has a flat inner portion interposed between the brake drum 5 and wheel disk 2 and is provided with openings through which the attaching bolts 6 pass, the latter securing the main and auxiliary wheels together. The diameter of the auxiliary wheel with the cushion tire 10 thereon is less than the diameter of the pneumatic tire 4.

The auxiliary wheel is further attached to the wheel disk 2 by the plate clip 11, one of which is shown in detail in Fig. 8, each plate clip having angularly bent apertured ends 12 abutting the main and auxiliary disk wheels and anchored thereto as by rivets or bolts 13. The plate clip 11 being disposed adjacent the peripheral edges of the assembled wheel structures also functions as a traction device as above described.

In the form of the invention shown in Fig. 5 the auxiliary wheel is associated with the vehicle wheel of the wooden spoke or artillery type, the attaching bolts 6 projecting laterally from the brake drum 5 passing between the wooden spokes 14 to receive a retaining plate 15 upon the outer ends thereof. In view of the direct radial disposition of the wooden spokes 14, the dished portion 11ª of the auxiliary disk wheel 8 is of less depth than the dished portion of the auxiliary wheel shown in Fig. 4 and the inner portion of the dished section 11ª is interposed between the brake drum 5 and wheel spokes 14. The plate clip 16 shown in detail in Fig. 10 connects the auxiliary disk wheel 8 to the felly 3ª of the wheel, the plate clip 16 having an apertured angle end 17 secured to the disk 8 and a lug extension 18 at its other end entering a socket in the felly 3ª forming a locking connection between the assembled wheel structures and functioning as a traction device.

The auxiliary wheel 8, as shown in Fig. 6 is associated with a vehicle wheel of the wire spoke type, the central dished portion 11ᵇ of the auxiliary wheel being secured to the wheel hub while the plate clip 19 shown in detail in Fig. 11 connects the assembled wheel structures adjacent the peripheral edges. The plate clip 19 has an apertured angle end 20 secured to the disk wheel 8 with the opposite end thereof bent to form a loop 21 enclosing a wire spoke and clamped thereon.

In the form of the invention shown in Fig. 7 the wheel rim 22 carrying the pneumatic tire 4 carries an angularly and outwardly directed inner side flange 23 with a relatively small peripheral rim 24 upon which an auxiliary solid tire 10 is mounted, the solid tire 10 being lowered into ground contact upon deflation of the pneumatic tire 4 and said auxiliary rim 24 being integral with the demountable rim 22, is bodily movable therewith.

In different types of vehicle wheels, the lateral bolts 6 are positioned at different points from the center of the wheel and to care for such changes, the auxiliary wheel disk 8 is provided with a plurality of concentric slots 25 as shown in Figs. 12 to 14, the bolts 6 in Fig. 12 being illustrated as passing through inner ones of said slots and the bolts 6 as illustrated in Fig. 13 being shown as passing through intermediate ones of said slots. In other respects, the auxiliary wheel is of a construction similar to the previously described forms of the invention and appropriate plate clips of the desired forms shown in Figs. 9 to 11 connect the auxiliary wheel to the main wheel.

From the above detailed description of the invention, it is believed that the construction and operation thereof will at once be apparent, and while there are herein shown and described the preferred embodiments of the invention, it is to be understood that minor changes may be made, such as will fall within the scope of the invention as claimed.

What I claim as new is:

1. A wheel structure comprising a pneumatic tired wheel, an auxiliary solid rubber tired wheel secured thereto and of less diameter than the pneumatic tired wheel, said auxiliary wheel comprising a disk body portion having a part thereof extending in a direct radial plane adjacent the periphery of the pneumatic tired wheel and parallel with the wheel, said part of the auxiliary wheel extending outwardly from a point substantially alined with the felly of the pneumatic tired wheel to a point inwardly of the tread, the central portion of the auxiliary wheel being dished toward the pneumatic tired wheel, and the connection between the two wheels including tractor clips between said felly and radial portion of the auxiliary wheel and anchor bolts between the dished portion of the auxiliary wheel and the pneumatic tired wheel.

2. A wheel structure comprising a pneumatic tired wheel, an auxiliary solid rubber tired wheel secured thereto and of less diameter than the pneumatic tired wheel, said auxiliary wheel comprising a disk body portion having a part thereof extending in a direct radial plane adjacent the periphery of the pneumatic tired wheel and parallel with the wheel, said part of the auxiliary wheel extending outwardly from a point inwardly of the felly of the pneumatic tired wheel to a point inwardly of the tread, the central portion of the auxiliary wheel being dished toward the pneumatic tired wheel with the center of the dished portion extending in a radial plane parallel with the pneumatic tired wheel and set inwardly of the aforesaid radial portion, the inner radial portion having a plurality of concentric slots therein, the connection between the two wheels including anchor members between the outer radial portion and wheel felly and anchor bolts extending through selective slots in the inner radial portion and engaged with the pneumatic tired wheel adjacent the hub thereof.

In testimony whereof I affix my signature.

PHILIP H. BACHRACH.